United States Patent
Trivelpiece et al.

(10) Patent No.: US 10,616,181 B2
(45) Date of Patent: Apr. 7, 2020

(54) SECURITY PANEL GATEWAY SYSTEM AND METHOD

(71) Applicant: Tyco Fire & Security GmbH, Neuhausen am Rheinfall (CH)

(72) Inventors: Craig E. Trivelpiece, Mission Viejo, CA (US); Alexandra Norton, Duxbury, MA (US); John Boudreaux, Boca Raton, FL (US)

(73) Assignee: Johnson Controls Fire Protection LP, Boca Raton, FL (US)

( * ) Notice: Subject to any disclaimer, the term of this patent is extended or adjusted under 35 U.S.C. 154(b) by 112 days.

(21) Appl. No.: 15/617,678

(22) Filed: Jun. 8, 2017

(65) Prior Publication Data

US 2018/0359220 A1 Dec. 13, 2018

(51) Int. Cl.
| | | |
|---|---|---|
| *G06F 21/00* | (2013.01) |
| *H04L 29/06* | (2006.01) |
| *H04L 29/12* | (2006.01) |
| *G08B 29/12* | (2006.01) |
| *H04L 12/66* | (2006.01) |
| *H04L 9/08* | (2006.01) |
| *G08B 25/08* | (2006.01) |
| *G08B 25/14* | (2006.01) |
| *G06F 21/60* | (2013.01) |
| *G08B 17/06* | (2006.01) |
| *G08B 13/22* | (2006.01) |

(52) U.S. Cl.
CPC ........ *H04L 63/0281* (2013.01); *G06F 21/602* (2013.01); *G06F 21/604* (2013.01); *G06F 21/606* (2013.01); *G08B 25/08* (2013.01); *G08B 25/14* (2013.01); *G08B 29/12* (2013.01); *H04L 9/088* (2013.01); *H04L 12/66* (2013.01); *H04L 61/157* (2013.01); *H04L 63/062* (2013.01); *H04L 63/123* (2013.01); *H04L 63/166* (2013.01); *G08B 13/22* (2013.01); *G08B 17/06* (2013.01); *H04L 67/42* (2013.01); *H04L 2209/76* (2013.01)

(58) Field of Classification Search
CPC .......... G06F 21/44; G06F 21/45; G06F 21/60; G06F 21/602; G06F 21/604; G06F 21/606; H04L 9/08; H04L 9/0816; H04L 9/088

See application file for complete search history.

(56) References Cited

U.S. PATENT DOCUMENTS

| | | | | |
|---|---|---|---|---|
| 9,609,003 | B1 * | 3/2017 | Chmielewski | G06F 16/954 |
| 2007/0112943 | A1 * | 5/2007 | Fisher | G06F 21/57 |
| | | | | 709/220 |
| 2009/0165114 | A1 * | 6/2009 | Baum | H04L 12/2803 |
| | | | | 726/12 |
| 2009/0204814 | A1 * | 8/2009 | Fisher | H04L 63/0428 |
| | | | | 713/162 |

(Continued)

OTHER PUBLICATIONS

Extended European Search Report, dated Aug. 30, 2018, from European Patent Application No. 18176494.5, filed on Jun. 6, 2018. 8pages.

*Primary Examiner* — Edward Zee
(74) *Attorney, Agent, or Firm* — HoustonHogle LLP

(57) ABSTRACT

A gateway system is used to establish secure connections between building management system control panels and connected services system servers. This enables status monitoring of the panels and maintenance of the panels and the building management systems.

13 Claims, 3 Drawing Sheets

(56) References Cited

U.S. PATENT DOCUMENTS

| | | |
|---|---|---|
| 2015/0113627 A1* | 4/2015 | Curtis .................... H04L 63/06 726/10 |
| 2016/0301695 A1 | 10/2016 | Trivelpiece et al. |
| 2016/0351036 A1 | 12/2016 | Saldin et al. |
| 2017/0015545 A1 | 1/2017 | Derby et al. |
| 2017/0155545 A1 | 6/2017 | Baum et al. |

* cited by examiner

SECURITY PANEL GATEWAY SYSTEM AND METHOD

BACKGROUND OF THE INVENTION

Building management systems such as building automation systems, fire alarm systems and intrusion systems are often installed within a premises such as commercial, residential, or governmental buildings. Examples of these buildings include offices, hospitals, warehouses, multi unit dwellings, schools or universities, shopping malls, government offices, and casinos.

Fire alarm systems typically include fire control panels that function as system controllers. Fire detection/initiation devices and alarm notification devices are then installed throughout the buildings and connected to the panels. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the device is activated and a signal is sent from the activated device to the fire control panel. The fire control panel then initiates an alarm condition by activating audio and visible alarms of the fire notification devices of the fire alarm system. Additionally, the fire control panel will also send an alarm signal to a monitoring station, which will notify the local fire department or fire brigade.

Intrusion systems typically include intrusion panels and monitoring devices, where the monitoring devices detect indications of intrusions and unauthorized access at or within the building and report to the intrusion panel. The monitoring devices of the intrusion systems often include motion sensor devices, surveillance camera devices, and door controllers that communicate with the intrusion panel over a security network. Motion sensor devices can detect intrusions and unauthorized access to the premises, and send indications of the intrusions to the security panel. The surveillance camera devices capture video data of monitored areas within the premises, and door controllers provide access to perimeter and/or internal doors, in examples.

The monitoring stations will typically monitor multiple security systems for alarm signals and then notify the proper authorities. Monitoring stations are often required by regulations, making them a standard component of most fire alarm systems, regardless of age or manufacturer of the fire alarm systems' components. These monitoring stations can be administered by a third party company, the same company that provides or manufactures the fire alarm and/or intrusion systems, or a public agency, among examples.

Building automation systems will typically include one or more building automation control panels and devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. Business-specific systems include computer systems, manufacturing systems that include various types of computer-aided machinery and test equipment, and inventory control and tracking systems, in examples.

More recently, it has been proposed to use connected services systems to monitor building management system control panels. In some cases, the control panels have been given network connectivity to communicate with the connected services systems; in other cases, the technicians have temporarily connected testing computers to the control panels that functioned as gateways. This has allowed the control panels to report status information to the connected services systems, which are typically administered by system companies and include, for example, databases for storing historical status information. These connected services systems will also often have remote diagnostic capabilities. As such, connected services systems facilitate the maintenance, compliance and tracking of repairs of building management systems.

SUMMARY OF THE INVENTION

Many installed building management systems vary by age and manufacturer. As a result, many of the control panels are not compatible with the newer connected services system. Examples of non-compatible control panels include (older) legacy control panels and panels manufactured by third parties. Legacy panels often lack the network connectivity necessary to connect to a connected services system. Similarly, third party panels lack network connectivity and/or use different protocols than the connected services system to communicate status information. As a result, connected services systems are unable to incorporate non-compatible panels.

Systems have been proposed to provide network connectivity to non-compatible control panels, including retrofitting non-compatible control panels with gateway devices. However, access to legacy panels to complete the installation is often difficult to achieve. But a larger concern is security. Older panels, which could not be accessed remotely via the Internet, for example, were robust against cyber attack. Adding connectivity can undermine that robustness.

The present invention concerns a gateway for control panels. It provides a number of features that harden the connection against cyber attack and ensure that the panel cannot be penetrated by a third-party.

In general, according to one aspect, the invention features a gateway system for a building management control panel. This system comprises at least one panel port for maintaining a connection to a control panel, at least one external port for connection to a remote server, and a controller for establishing encrypted communication with the remote server.

Some embodiments include a physical presence button for enabling communication with the remote server only when a technician is present who can physically press the button.

Preferably, the gateway stores an encryption key for encrypting messages to the remote server. This key might be stored in a write once read many (WORM) memory.

The gateway can also store a static IP address that it uses to contact the remote server.

This gateway can be used to connect to different types of building management system control panels, such fire control panels, intrusion control panels, and building automation control panels.

In general, according to another aspect, the invention features a method for providing a gateway to a building management control panel. This method comprises a gateway maintaining a connection to a control panel, the gateway establishing a connection to a remote server, and the gateway transmitting and receiving encrypted communication with the remote server.

In general, according to still another aspect, the invention features a system for establishing a connection to a building management system control panel. This system comprises a remote server and a gateway including at least one panel port for maintaining a connection to the control panel, at least one external pork for connection to the remote server, and a controller for establishing encrypted communication with the remote server.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
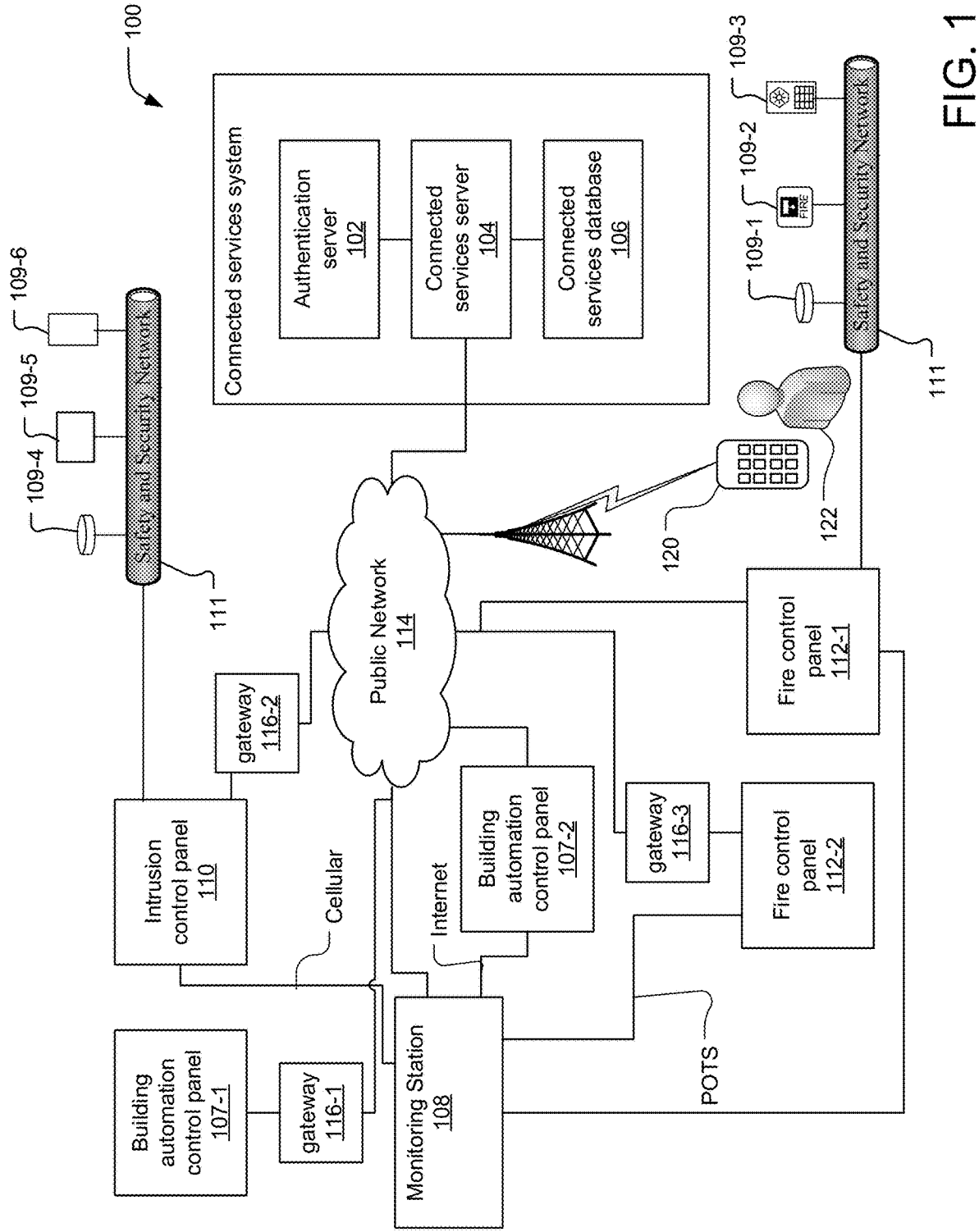
FIG. 1 is a block diagram of a connected services system monitoring building management systems control panels of automation, fire and intrusion alarms systems.

FIG. 1 is a block diagram showing a connected services system 100 monitoring building management system control panels 107, 110, 112 of automation, fire and intrusion alarms systems in which some of the control panels communicate with the connected services system via gateways 116 according to the present invention.

As is also common, the fire and intrusion control panels 110, 112 will almost universally communicate with a monitoring station 108, which is a service for monitoring multiple fire and/or intrusion alarm systems for indications of a potential fire and/or security incident and notifying the proper authorities, such as the fire department and/or police. Monitoring stations 108 can be administered by a third party company, the same company that manufactured the fire and/or intrusion alarm system, the same company providing the connected services system 100, or a public agency, among other examples. They are often required by regulations, making them a standard component of most fire alarm systems.

In different examples, the control panels will send signals to the monitoring station 108 via several different transmission media, including wide area networks such as the internet, telephone systems, wireless radio networks, cellular networks and voice over internet protocol (VOIP) systems.

In general, the connected services system 100 facilitates the monitoring, maintenance, testing, configuration and repair of the building management systems, such as building automation systems, fire alarm systems and intrusion detection systems, by gathering and storing information from those connected systems.

The connected services system 100 includes a connected services server 104 and a connected services database 106. The connected services server 104 receives information from various connected systems typically via a public network 114, which is a wide area network such as the internet, and stores the information in the connected services database 106.

The connected services system 100 gathers data from building automation, fire alarm and intrusion detection systems by receiving information reported and transmitted from the systems' control panels 107, 110, 112.

The control panels 107, 110, 112 are devices that direct the function of systems by determining and displaying the operational status of connected slave devices, such as building automation sensor devices and controller devices, fire detection and notification devices and intrusion detection devices and by receiving status and alarm signals from devices, among other examples.

Each of the control panels 107, 110, 112 will each support one or multiple loops or networks of devices. For example, a network of fire detection and alarm notification devices 109-1, 109-2, 109-3 is shown, connected to the fire control panel 112-1; and a network of intrusion detection and alarm notification devices 109-4, 109-5, 109-6 is shown, connected to the intrusion control panel 110. The building automation panel would have a similar network of sensor devices and controller devices.

Common examples of the fire detection devices 109-1, 109-2 typically include smoke detectors 109-1, carbon monoxide detectors, temperature sensors, and/or manual pull stations 109-2, to list a few examples. Similarly, examples of the fire alarm notification devices 109-3 generally include speakers/horns 109-3, bells/chimes, light emitting diode (LED) reader boards and/or flashing lights (e.g., strobes). In general, the fire detection and fire annunciation devices 109-1 to 109-3 connect to the fire control panels 112 via a safety and security wired and/or wireless network 111 (also known as a loop), which supports data communication between the devices 109-1 to 109-3 and the control panels 112.

Common examples of the intrusion detection devices 109-4, 109-5 typically include a relay 109-4 that signals the opening of a door or window, for example. Intrusion devices will also often include motion sensors 109-5. Similarly, examples of the intrusion notification devices 109-6 generally include speakers/horns, bells/chimes, light emitting diode (LED) reader boards and/or flashing lights (e.g., strobes). In general, the intrusion devices 109-4 to 109-6 connect to the intrusion panels 110 via safety and security wired and/or wireless networks 111, which supports data communication between the devices 109 and the intrusion panels 110.

The illustrated example includes compatible control panels 107-2, 112-1, which directly transmit data to and receive data from the connected services server 104 via the public network 114, usually additionally through enterprise and/or cellular data networks. Data transmitted from compatible control panels 107-2, 112-1, to the connected services server 104 include status information, diagnostic information and testing information pertaining to the control panels and the panels' slave device. Status information can include information about whether the system is operational and whether an alarm state is indicated.

Generally, diagnostic information is data detected by various devices of the fire alarm system that can be used to optimize or repair the system, and testing information is information about any tests of the control systems. In some examples, diagnostic information includes identification information such as a unique identifier for the control panel 107, 110, 112, address of the device or devices, location information such as a physical location of the devices (109-1, 109-2 . . . 109-n), a date and time of the activation, status information, including a fault state of the activated devices, analog and/or detected value generated by the devices such as a detected smoke level or detected ambient temperature. Data transmitted from the connected services server 104 to the compatible control panels might include software and firmware update information for updating the software and firmware executing on the control panels, or firmware executing on the devices 109-1 to 109-6 connected to those panels.

Also illustrated are non-compatible control panels 107-1, 110, and 112-2 such as legacy control panels and third party control panels. Legacy control panels are control panels that lack network connectivity and thus are unable to connect via the public network 114. Such control panels can be manufactured by the same company providing the connected services system 100 but at a time before network connectivity was desirable in control panels. Third party control panels are control panels manufactured by different companies or business entities than that providing the connected services system 100 and may or may not have network connectivity. Even if they have network connectivity, third party control panels will often use different protocols than the connected services system to communicate status, diagnostic and testing information.

According to the invention, non-compatible control panels 107-1, 110, and 112-2 are retrofitted with gateway devices 116 that enable network connectivity and connectivity to mobile computing devices 120 operated by technician.

In the illustrated example, the non-compatible control panels 107-1, 110, and 112-2 connect to gateway devices 116-1, 116-2, 116-3, respectively. The gateway devices 116 provide access for the non-compatible control panels 107-1, 110, 112-2 to the public network 114 and thus to the connected services server 104 and/or to the connected services server 104 via the mobile computing device 120 operated by technician 122.

Also shown is an on-site technician 122 using a mobile computing device 120. In general, the technicians will perform maintenance, testing and repair on the different control system panels. The mobile computing device 120 connects to the public network 114 over a wireless communication link and operated by the technician 122. In examples, the mobile computing device 120 is a laptop computer, smart phone, tablet computer, or phablet computer (i.e., a mobile device that is typically larger than a smart phone, but smaller than a tablet), to list a few. The mobile computing device 120 receives and displays status, diagnostic and testing information from the connected services server 104 via the public network 114, in one example.

Figure 2:
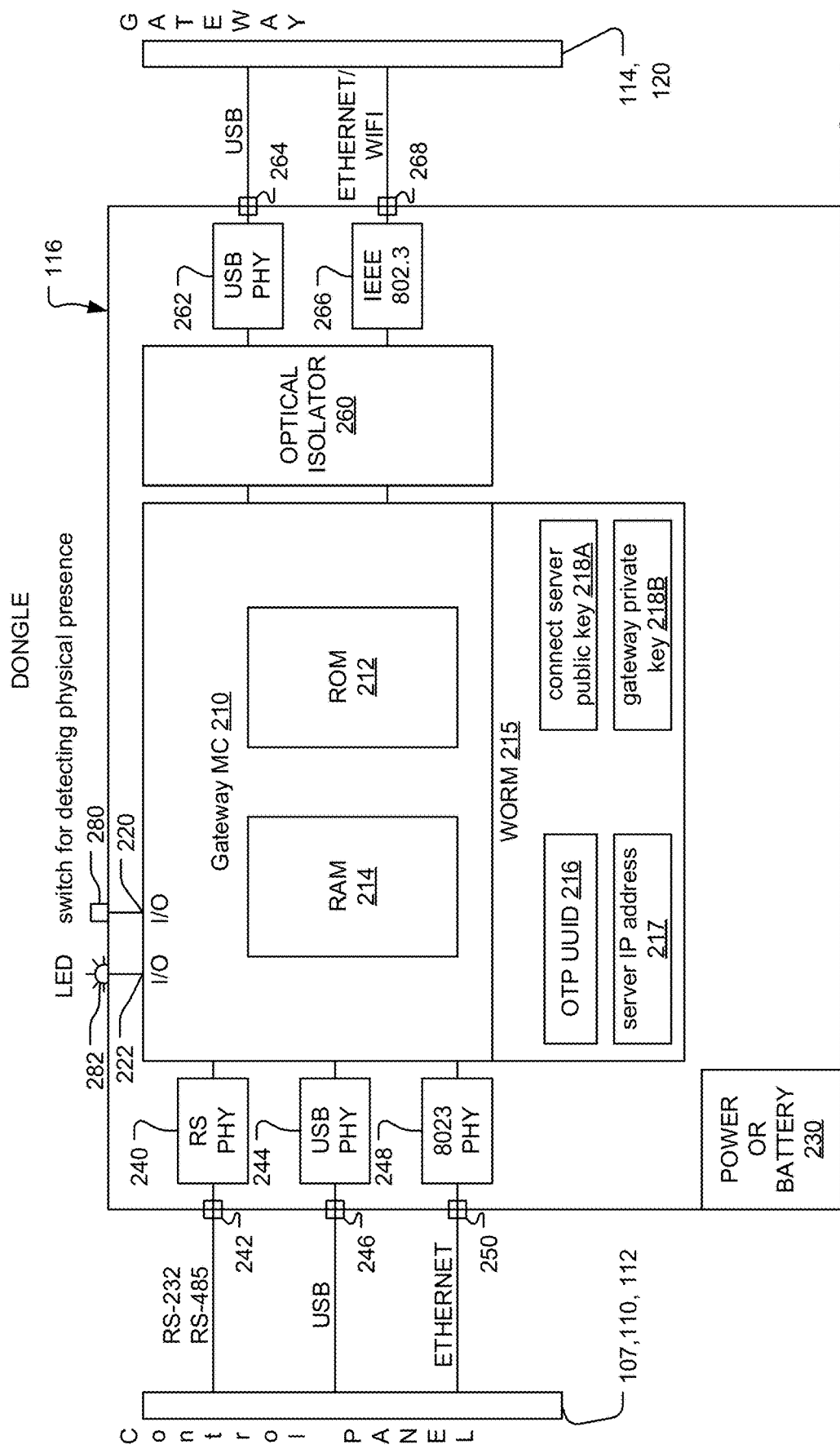
FIG. 2 is a block diagram showing a gateway according to the present invention.

FIG. 2 shows a gateway 116 which is been constructed according to the principles of the present invention.

The gateway 116 is operated by a gateway microcontroller 210. It communicates with the connected services server 104 via one of potentially two external ports. In the illustrated example, there is a universal serial bus (USB) port 264 and an IEEE 802.3 (Ethernet) port 268 (8P8C connector).

For each of these external ports 264, 268, there is a corresponding physical layer chipset (PHY). For example, a USB physical layer chipset 262 enables the communications over the USB port 264 and an IEEE 802.3 physical layer chipset 266 maintains the communications over the port 268.

In the illustrated example, the microcontroller 210 communicates with the USB physical layer chipset 262 and the IEEE 802.3 physical layer chipset 266 via an optical isolator 260. The optical isolator, also called an optocoupler, photocoupler, or optical isolator, electrically isolates to electronic circuits from each other by transferring electrical signals using modulated optical signals. These isolators prevent high voltages at the external ports 264, 268 from otherwise affecting the gateway 116 and its microcontroller 210 and also isolate the electrical connection to the control panel 107, 110 and 112. Optionally, the optical isolator could be located to isolate 240, 244 and 248 if that provided more protection to the control panel from the power supply at 230.

In other examples, one of the external port physical layer chipsets is a Wi-Fi chipset, with the port (e.g., 266) comprising an antenna for wireless connection to the connected services server 104 via a wireless access point to the Internet.

As is common, the gateway microcontroller 210 typically includes integrated random access memory 214 and integrated read only memory 212, which contains the gateway's firmware. In the preferred embodiment, the gateway microcontroller 210 further comprises a write once read many (WORM) memory 215. In such memories, once data written, it cannot be modified. This write protection affords the assurance that the data cannot be tampered with once it is written to the device.

In the WORM memory 215, a unique user identification (UUID) is stored. Further, a static IP address 217 of the connected services server 104 is further stored. Also stored is the public key 218A of the connected services server 104. Finally, the WORM 215 also stores the private key 218B uniquely assigned to the gateway 116.

In the illustrated embodiment, a number of panel ports 242, 246, 250 are provided. Specifically, an RS-232 panel port 242, a USB panel port 246, and an IEEE 802.3 panel port 250 are provided to enable communication with the control panel 107, 110, 112.

Here physical layer chips or chipsets are provided for each the ports. Specifically, a RS-232 physical layer chipset (PITY) 240 maintains the RS-232 port, a USB physical layer chipset 244 maintains the USB port 246 and an IEEE 802.3 port physical layer chipset 248 maintains port 250.

In the it example, a power source or battery 230 is provided on the gateway 116 to power the components.

Further, on the exterior housing of the gateway are an LED light indicator 282 and a physical presence switch 280. The LED 280 driven by the microcomputer 210 via an I/O port 222. Further, the gateway microcontroller 210 monitors the status of the physical presence switch 280 via I/O port 220.

Figure 3:
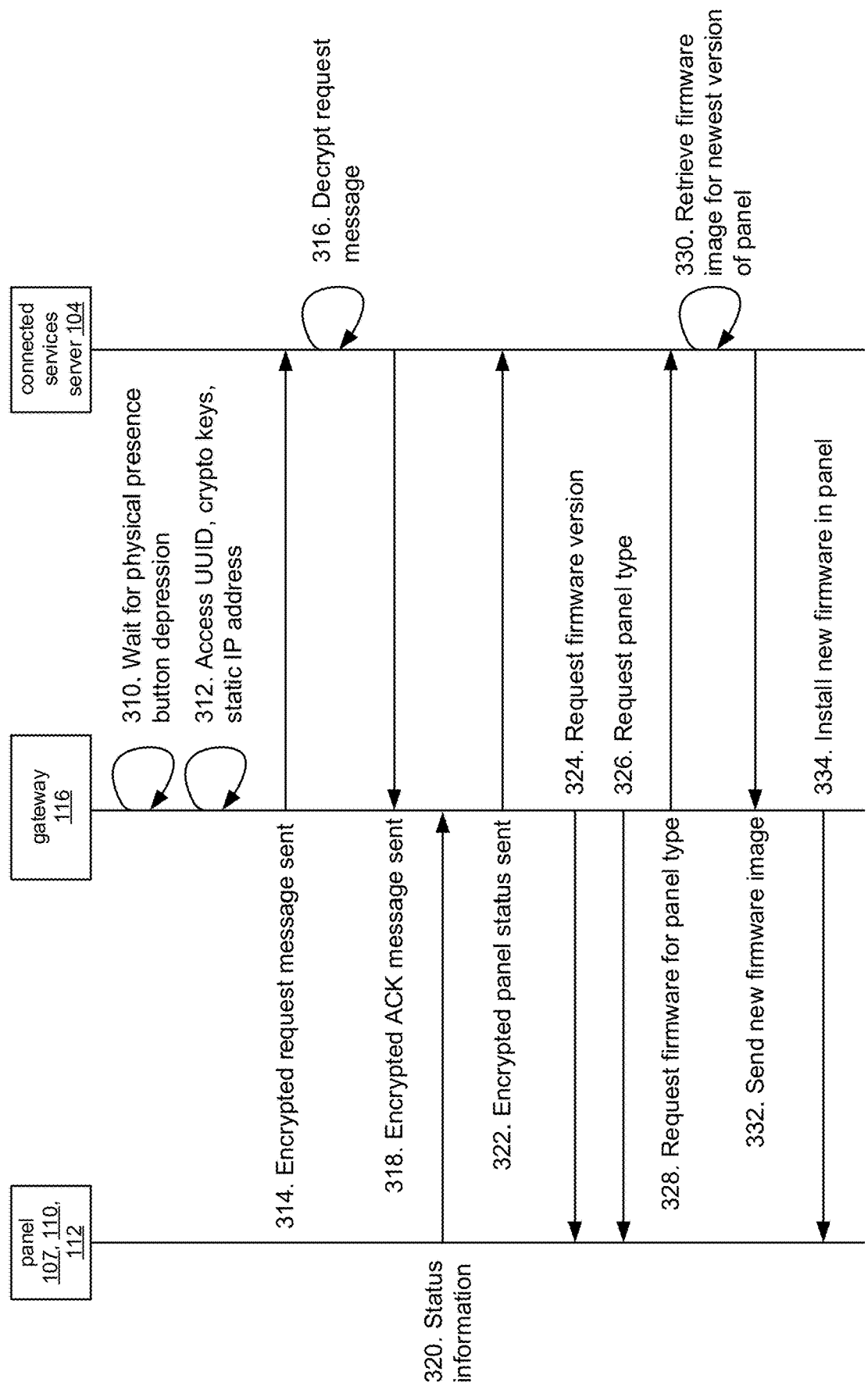
FIG. 3 is a sequence diagram illustrating communication between a control panel, gateway and connected services server, according to the present invention.

FIG. 3 is a sequence diagram illustrating how the gateway 116 facilitates communication between the panel 107, 110, 112, to which it is connected, and the connected services server 104.

In step 310, the gateway 116 waits for the technician to depress the physical presence button 280 on the case of the gateway 116. This is important for some embodiments because it requires the presence of the technician to initiate any communications with the connected services server 104. This helps to ensure that third parties cannot remotely initiate a connected to the panel.

In other examples, the gateway will contact the connected services server 104 on its own initiative despite a technician not being present and depressing the physical presence button 280.

In step 312, the microcontroller 210 of the gateway 116 then accesses the unique identification number (UUID) 116 and the cryptographic keys 218A, 218B stored in the WORM memory 215. The microcontroller 210 further accesses the static IP address 217 associated with the connected services server 104.

The microcontroller 210 forms a request message to the connected services server 104 using the stored static IP address 217. This request message is then encrypted using the public cryptography key 218A of the connected services server 104. The message is then transmitted out the active one of the external ports 264, 268 in step 314. Specifically, it is transmitted out the USB port 264 or the IEEE 802.3 port 268 to the connected services server 104.

The connected services server 104 receives the request message from the gateway 116. The server decrypts the message using its private key in step 316. The server 116 then extracts the UUID 216 contained in the message and then performs a lookup into the database 106 to find the public cryptography key associated with the UUID 216 of the gateway 116. The connected services server further authenticates the request message and the panel by reference to the authentication server 102.

Using the public cryptography key of the gateway 116, the connected services server 104 encrypts an acknowledgment message, which is then transmitted to the gateway 116 in step 318. The gateway's microcontroller 110 on receipt of this message, accesses its private key 218B and decrypts the message.

In this way a secure connection is established between the gateway 116 and the connected services server 104.

This secure connection can be used to access the panel 107, 110, 112 via the gateway 116. The gateway 116 can interrogate the panel 107, 110, 112 to obtain its status in step 320. This information can then be encrypted and transmitted to the connected services server 104 in step 322.

This information accessed from the control panel 107, 110, 112 takes a number of different forms. It can be status information, diagnostic information and testing information pertaining to the control panels and the panels' slave device.

The status information can include information about whether the system is operational and whether an alarm state is indicated.

The diagnostic information is data detected by various devices of the fire alarm system that can be used to optimize or repair the system.

The testing information is information about any tests of the control systems. In some examples, diagnostic information includes identification information such as a unique identifier for the control panel 107, 110, 112, address of the device or devices, location information such as a physical location of the devices (109-1, 109-2 . . . 109-n), a date and time of the activation, status information, including a fault state of the activated devices, analog and/or detected value generated by the devices such as a detected smoke level or detected ambient temperature.

In another example, the gateway 116 can perform a firmware update of the panel 107, 110, 112.

In this example, the gateway 116 accesses the current firmware version of the control panel 107 110, 112 in step 324 via the active control panel port 242, 246, 250. That is, depending on to which of the control panel ports is connected to the control panel 107, 110 112, the microcontroller 210 via that panel port, requests the control panel's firmware version. In step 326, the panel's serial number and model information might also be accessed.

The firmware version, serial number and panel model are transmitted to the microcontroller 210. The gateway microcontroller 210 then sends this panel information to the connected services server 104 or directly requests the required firmware. In either case, the information is transmitted in an encrypted message in step 328.

In step 330, the connected services server 104 accesses a newer version of the firmware for the panel 107 110, 112 in the database 106 based on the panel's serial number and model information or the gateway's request.

In step 332, this new firmware image is transmitted in an encrypted message to the microcontroller 210 of the gateway 116.

The gateway 116 then installs the new firmware on the panel 107, 110, 112, in step 334.

In this way, a gateway can provide a secure connection between an older control panel or a non-compatible control panel and a remote connected services server 104.

Control panel 107, 110 and 112 may require passwords to enable various test modes and communications. The gateway 116 can store these passwords locally for secure access and never need to store those passwords at a server or transmit them over the Internet. Many of the older control panel devices have simplistic passwords because service personnel must type them into the panel. On the other hand, the gateway 116 enables the use of longer, more secure passwords. Moreover, different users, having different levels of access, are assigned their own passwords, in some embodiments. Further, the panel's password does not need to be exposed to the service personnel.

While this invention has been particularly shown and described with references to preferred embodiments thereof, it will be understood by those skilled in the art that various changes in form and details may be made therein without departing from the scope of the invention encompassed by the appended claims.

What is claimed is:

1. A gateway system for a building management control panel, comprising:
    at least one panel port for maintaining a connection to the building management control panel;
    at least one external port for connection to a remote server;
    a write protected memory storing an encryption key, a static IP address, and an identification for identifying the gateway system to the remote server;
    a controller for establishing encrypted communication using the encryption key, with the remote server via the static IP address using the identification, to identify the gateway system to the remote server and receiving status information from the building management control panel via the panel port; and
    a physical presence button for enabling the communication with the remote server, wherein the controller establishes the communication with the remote server only after the physical presence button is depressed by a technician, wherein the physical presence button is on an exterior housing of the gateway system, and the controller monitors the status of the physical presence button and waits for the technician to depress the physical presence button before initiating any communications with the remote server.

2. The system as claimed in claim 1, wherein the building management control panel is a fire control panel.

3. The system as claimed in claim 1, wherein the building management control panel is an intrusion control panel.

4. The system as claimed in claim 1, wherein the building management control panel is a building automation control panel.

5. The system as claimed in claim 1, wherein the controller accesses a current firmware version of the building management control panel via the panel port.

6. The system as claimed in claim 1, further comprising an optical isolator for electrically isolating the external port from the controller and/or an electrical connection to the control panel via the panel port.

7. A method for providing a gateway to a building management control panel, the method comprising:
    the gateway maintaining a connection to the building management control panel;
    the gateway establishing a connection to a remote server via a static IP address stored in a write protected memory using an identification, which is stored in the write protected memory, to identify the gateway to the remote server;
    the gateway transmitting and receiving encrypted communication with the remote server using an encryption key stored in the write protected memory and receiving status information from the building management control panel via a panel port of the gateway; and
    the gateway establishing the communication with the remote server only after a physical presence button of the gateway is depressed by a technician, wherein the physical presence button is on an exterior housing of the gateway, and the gateway monitors the status of the physical presence button and waits for the technician to depress the physical presence button before initiating any communications with the remote server.

8. The method as claimed in claim 7, wherein the building management control panel is a fire control panel.

9. The method as claimed in claim 7, wherein the building management control panel is an intrusion control panel.

10. The method as claimed in claim 7, wherein the building management control panel is a building automation control panel.

11. The method as claimed in claim 7, further comprising the gateway retrieving status information from the building management control panel and encrypting and transmitting the status information to the remote server.

12. The method according to claim 11, wherein the status information includes status history information and state data.

13. A system for establishing a connection to a building management system control panel, comprising:
    a remote server; and
    a gateway including at least one panel port for maintaining a connection to the building management system control panel, at least one external port for connection to the remote server, a controller for establishing encrypted communication using an encryption key stored in a write protected memory, with the remote server via a static IP address stored in the write protected memory using an identification, which is stored in the write protected memory, to identify the gateway to the remote server, and receiving status information from the building management system control panel via the panel port, and a physical presence button for enabling the communication with the remote server, wherein the controller establishes the communication with the remote server only after the physical presence button is depressed by a technician, wherein the physical presence button is on an exterior housing of the gateway, and the gateway monitors the status of the physical presence button and waits for the technician to depress the physical presence button before initiating any communications with the remote server.

* * * * *